(12) United States Patent
Ng et al.

(10) Patent No.: US 9,189,285 B2
(45) Date of Patent: Nov. 17, 2015

(54) SCALABLE SERVICES DEPLOYMENT

(71) Applicant: Microsoft Corporation, Redmond, WA (US)

(72) Inventors: Samuel Ng, Bellevue, WA (US); Jake Carver Swenson, Seattle, WA (US); Rodrigo Maialle Bomfim, Sammamish, WA (US); Rajesh Kutpadi Hegde, Redmond, WA (US); Prasanna Kudli, Redmond, WA (US); Anton Kucer, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 276 days.

(21) Appl. No.: 13/716,066

(22) Filed: Dec. 14, 2012

(65) Prior Publication Data

US 2014/0173594 A1 Jun. 19, 2014

(51) Int. Cl.
G06F 9/455 (2006.01)
G06F 15/16 (2006.01)
G06F 9/50 (2006.01)

(52) U.S. Cl.
CPC ............ *G06F 9/505* (2013.01); *G06F 9/45533* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,010,679 B2 | 8/2011 | Low et al. | |
| 2002/0152305 A1* | 10/2002 | Jackson et al. | 709/224 |
| 2011/0231899 A1 | 9/2011 | Pulier et al. | |
| 2011/0265164 A1 | 10/2011 | Lucovsky et al. | |
| 2011/0295984 A1* | 12/2011 | Kunze | 709/220 |
| 2012/0054763 A1 | 3/2012 | Srinivasan | |
| 2012/0089726 A1 | 4/2012 | Doddavula | |
| 2012/0266168 A1* | 10/2012 | Spivak et al. | 718/1 |

OTHER PUBLICATIONS

Cisco, "Cisco Unified Network Services: Overcome Obstacles to Cloud-Ready Deployments," White Paper, 2011, (6 pages), San Jose, CA.
Venugopal, Srikumar, et al., "OpenPEX: An Open Provisioning and EXecution System for Virtual Machines," 17th International Conference on Advanced Computing and Communications, Aug. 24, 2009, (9 pages).
Llorente, Ignacio M., "A Flexible and Interoperable Cloud Operating System," (Retrieved from: http://blog.dsa-research.org/?p=282 on Oct. 25, 2012), Jan. 13, 2010, (4 pages).
Varia, Jinesh, "Architecting for the Cloud: Best Practices," Paper, Jan. 2010, (21 pages).

* cited by examiner

*Primary Examiner* — Tammy Lee
(74) *Attorney, Agent, or Firm* — Ben Tabor; Kate Drakos; Micky Minhas (57) ABSTRACT

Embodiments provide an abstraction on top of virtual machine allocation APIs to expose scalable services. The services are higher level components that expose a particular set of functionalities. A deployment manager handles matching and managing virtual machine allocations in order to meet the customer demands for the managed services. A deployment service exposes a "service" as a unit of resource allocation in a distributed computing environment or cloud computing service. Client components interact with the deployment service to request new service instances to meet customer demand.

18 Claims, 6 Drawing Sheets

SCALABLE SERVICES DEPLOYMENT

BACKGROUND

Various cloud service hosting solutions are available to customers, such as public clouds, private clouds, and hybrid clouds. Public or shared clouds allow customers to provide services to users over a network, such as the Internet, an intranet, or other public or private data network, with little or no control over the underlying technology infrastructure. Public clouds offer customers reduced complexity in testing and deploying new services. Private or enterprise clouds are deployed over a company intranet or hosted datacenter and offer private services for a company or organization. Private clouds may provide security, availability, or fault-tolerant solutions that are not possible in a public cloud because the private cloud typically does not share resources with other organizations. Hybrid clouds provide an integrated approach that combines the power of both public and private clouds. Customized rules and policies may be used to allocate activities and tasks to internal or external clouds as needed.

Each cloud type—public, private, or hybrid—may be used to provide different service types. Software-as-a-Service (SaaS) provides a specific service, such as an email service or a data center service, which is hosted on the cloud and allows end users to access the service over the Internet. Platform-as-a-Service (PaaS) provides a programmable environment where code can be deployed, which allows customers to deploy their applications in the cloud without having to manage the server infrastructure. Infrastructure-as-a-Service (IaaS) provides customers with maximum interaction with the underlying server infrastructure. IaaS customers rent the hardware, such as servers, load balancers, firewalls, and cables, and configure them remotely with their own solutions.

Cloud service providers offer customers the ability to provision new virtual machines as needed. However, this process is cumbersome because it takes time, requires many different APIs to be called to manage operating systems and application images. For example, the customer must determine what bandwidth is required for a service, and then determine what virtual machine resources are needed to support that bandwidth under desired service-level agreements (SLA). The customer must understand the virtual machines capabilities and then deploy and manage the virtual machines. This requires specialized knowledge and resources that may be outside the customer's capabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide an abstraction on top of virtual machine allocation APIs to expose scalable services. The services are higher level components that expose a particular set of functionalities. A deployment manager handles matching and managing virtual machine allocations in order to meet the customer demands for the managed services.

A deployment service exposes a "service" as a unit of resource allocation in a cloud service. Client components interact with the deployment service to request new service instances to meet customer demand.

In one embodiment, a deployment service allows customers to configure services on a cloud service for various users. A customer provides a service package to a cloud service. The service package comprises a virtual machine image capable of being deployed on the cloud service. A package instance is allocated to a virtual machine on the cloud service. The package instance represents an instance of the service package. A service instance is created in response to a user requesting access to a service described in the service package. The service instance is associated with the package instance allocated to the virtual machine. Endpoint information and connection credentials are provided to the user for access to the service instance. The customer interacts with the deployment service via a REST API.

The customer may allocate additional package instances to additional virtual machines on the cloud service to maintain a customer bandwidth requirement. Also, the customer may create additional service instances in response to additional user requests for access to the service described in the service package.

In another embodiment, a service deployment system comprises a manager that operates on REST API requests to manage services for users, a provider that operates to provision services by deploying service instances on virtual machines in the computing environment, a communication manager operating to provide communication between the provider and the virtual machines, and a resource manager operating to deploy virtual machine images to support the service instances. A host on each virtual machine, the host operates to provide bidirectional communication between the virtual machine and the provider.

In an origin streaming service embodiment, customers may establish a media streaming service hosted on a cloud service. The user requests to subscribe to a streaming media service and provides a bandwidth requirement for the streaming media service. A service instance is deployed to one or more virtual machines in order to provide the streaming media service at the bandwidth level. A service endpoint is exposed for the user to provide access to the streaming media to clients.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In one embodiment, a Deployment Service (DS) exposes a service instance as a unit of resource allocation for a cloud computing environment. Client components interact with the deployment service to request new service instances to meet customer demand. The service instances are internally managed by the deployment service through a pluggable model. Different services may have different allocation and management policies.

The service instances are abstracted from the virtual machine and hardware resources of the cloud computing environment so that the customer does not have to configure infrastructure or understand how to allocate the virtual machines or other hardware. This provides a more optimal use of resources wherein virtual machines pools can be used to offer various services and balanced accordingly with the customer's resource needs.

A flexible allocation policy allows services to be internally mapped to virtual machines in different ways. For example, a single virtual machine may host multiple service instances, or a service instance may map to one of multiple virtual machines that are hosting the service. Service allocation management is extended to providers by an extensible/pluggable model that provides different allocation policies depending on service characteristics and customer needs. In addition to allocating virtual machines to a service in response to customer instructions, new virtual machines can be preemptively allocated for a service based on predicted demand, which reduces or completely eliminates service allocation time.

For each individual service offered, the deployment service manages service images for virtual machine deployment. The service images may be in any of the various formats supported by the underlying cloud infrastructure, such as operating system images (e.g., *.vhd files), cloud service packages (e.g., *.cspkg files), or any other appropriate format. The deployment service manages image upgrades to ensure no service downtime.

A two-way communication channel is established with the allocated virtual machines during provisioning. The communication channel allows an agent on each of the virtual machines to communicate with the deployment services to enable or facilitate the services allocation.

The health of the virtual machines hosting service instances is continuously monitored through heartbeats. New virtual machines may be automatically deployed and started if individual machine failures are detected. Built in fault tolerance mechanisms ensure that resources are correctly allocated even in case of temporary failures of the underlying cloud service platform.

The deployment service is aware of multiple subscriptions or payment models for the underlying cloud infrastructure. The deployment service manages subscriptions to allow services to be deployed to different subscriptions, including subscriptions owned by third party partners. The deployment service security infrastructure manages various authentication and authorization aspects for the management of the virtual machines and subscriptions.

Clients of the deployment service manage all the aspect of their services through a management REST API. Different implementation options allow the scalable service deployment to be offered through a dedicated service in the cloud or through programming libraries in a more simplified version.

The deployment services implementation has the following components in one embodiment:
REST API: an http RESTful API that exposes management capabilities for the managed scalable services.
Deployment Manager: core logic for resource allocation that also exposes extensibility points through loaded providers.
Deployment Services Provider: a pluggable component the enables the resource management for a particular set of managed services.
Resource Management Database: a persistent store that retains information such as:
allocated services,
allocated virtual machines,
service images,
logs.

Customers of the deployment services may include, for example, cloud service partners and/or internal teams. The customers first subscribe to the service and provide information such as the services to be exposed, service images, and any specialized provider, if required because the default provider is not sufficient for a customer's needs. When the customer has signed up with the service, they can begin managing their service allocation through the deployed service REST APIs. This allows them to expose their service through their own APIs and use the deployed services in the background for resource allocation needs.

Figure 1:
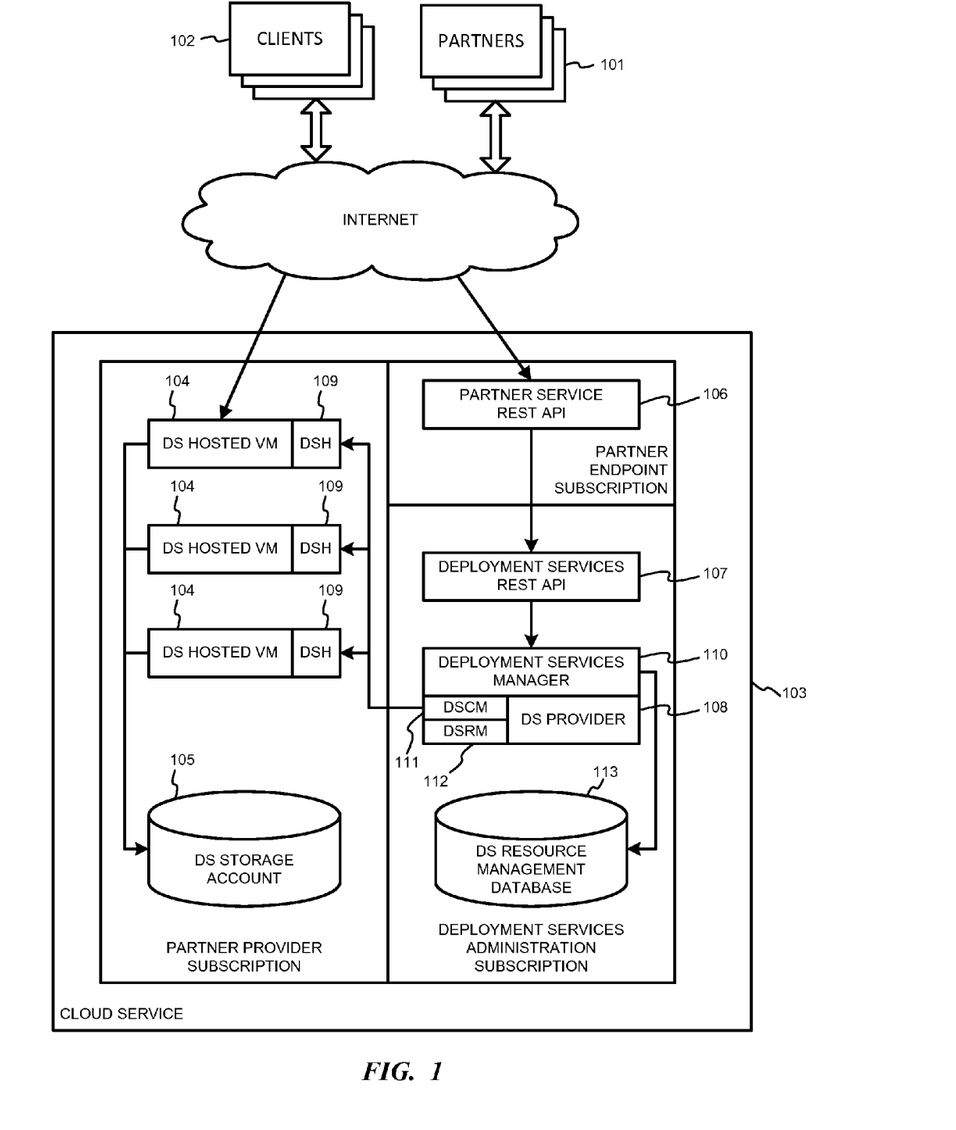
FIG. 1 illustrates the interfaces and API contracts for a Deployment Services (DS) system according to one embodiment.

FIG. 1 illustrates the interfaces and API contracts for a Deployment Services (DS) system according to one embodiment. Partners 101 provide clients 102 access to services hosted on a cloud service 103 by the DS system. A partner 101 subscribes to the cloud service 103 to use assets, such as virtual machines (VM) 104 and storage component 105. Partners first register with the DS and provide certain information during an onboarding process. This information may include, for example, a cloud services subscription identifier, a subscription management certificate, or other information used by the DS to create deployments on behalf of the partner.

During the onboarding process the partner provides DS with the public key component of any certificate that will be used for client authentication for the partner Service REST API 106. The partner REST API client certificate is used to authenticate the partner's interactions with the Deployment Services REST API 107. When the DS host starts up it will use a partner DS Host Authentication certificate to connect to a DS communications REST API and establish a communications channel.

Packages provided the by the partner (partner packages) contain the information used to deploy an instance of a partner service. The partner packages are composed of an IaaS OS image and the corresponding configuration options for a partner service. An IaaS operating system image may be provided for each region where the service is available. Partners may upload virtual hard disk (VHD) images to storage accounts in each region wherein their service will be available. The images are typically uploaded before onboarding a partner Service Package with DS.

The configuration options for each image may include, for example, service certificates, network configuration, available regions and VHDs, machine size, and a package name. Service certificates include a list of PFX certificates and corresponding certificate passwords to be installed on the machine. The network configuration information includes, for example, a list of the network ports that need to be exposed when a packaged VM Image is deployed. The network port values include: LocalPort, Port, and Protocol. The available regions and VHDs list the cloud service regions and an IaaS image name for each region where the service will be deployed.

The DS REST API 107 contains a set of REST endpoints to make/cancel resource reservations (e.g., checkout/checkin) and to get the status of a reservation (e.g., acquiring, ready, reclaimed). DS REST API 107 may be an OData V3 API, for example, that allows partners to query the API based on a subset of the query operations supported by OData. REST calls are done using mutual certificate client authentication. When a partner is onboarded, its client certificate is registered with DS to allow the partner to authenticate to the REST APIs.

Figure 2:
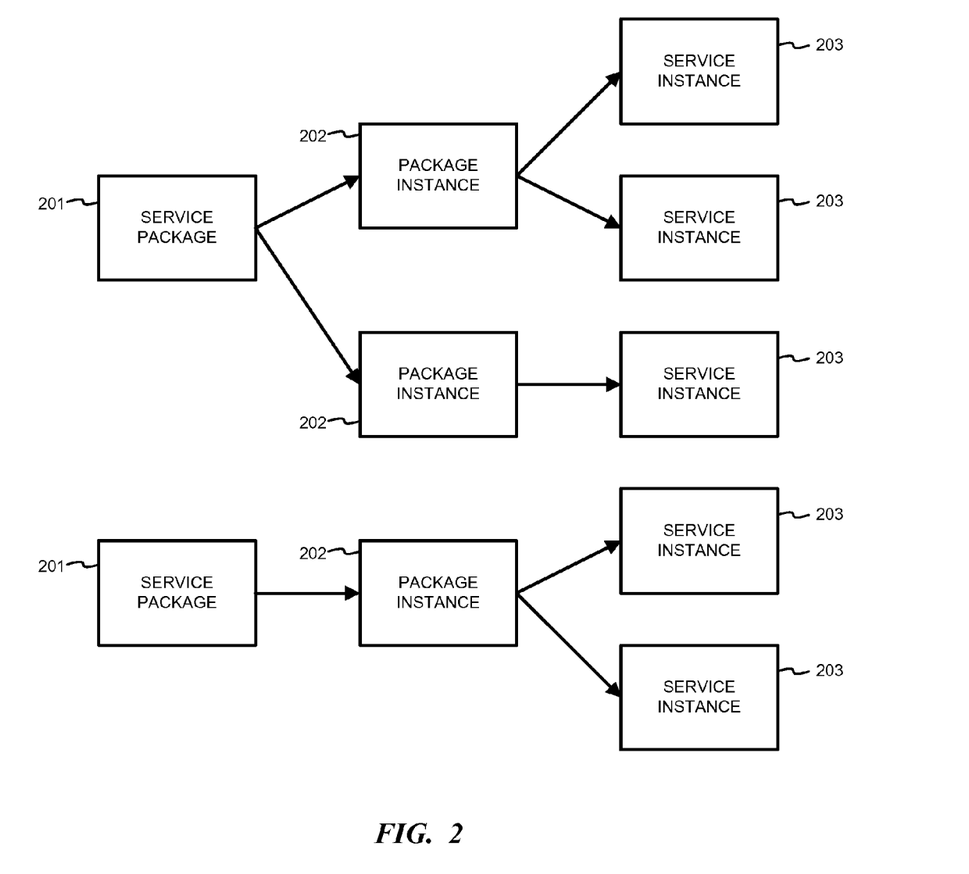
FIG. 2 is a conceptual model of the objects that may be exposed from the REST API in one embodiment.

FIG. 2 is a conceptual model of the objects that may be exposed from the REST API in one embodiment. A Service Package 201 is modeled as the VHD, which is a virtual machine (VM) image, and the related configuration for that image. Service Package 201 can have zero or more children Package Instances 202, which are modeled as the VM instance of a Service Package 201. Each Package Instance 202 has a one-to-one mapping with a VM in a deployment. Package Instances 202 have at most one parent Service Package 201. Package Instances 202 may have zero or more Service Instances 203. The mapping of Service Instances 203 to Package Instances 202 it maintained by a deployment services provider 108 (FIG. 1).

The Service Instances 203 can be modeled as the result of requesting access to a service. A Service Instance 203 contains the information used to access the service that was described by a corresponding Service Package 201 and allocated on a Package Instance 202 or VM. Service Instances 203 may be associated with most one parent Package Instance 202 and, therefore, at most one Service Package 201.

Table 1 contains a set of operations that are available on the REST API according to one embodiment of the DS.

TABLE 1

| Relative URI | Supported HTTP Methods | Result Cardinality | Summary |
| --- | --- | --- | --- |
| /ServiceInstances | GET | Many | Gets the list of available checked out services, these can be filtered using a subset of OData V3 filters. |
| /ServiceInstances | POST | N/A | This is a request to create an instance of the specified service instance resulting in the creation of a service instance that can be queried above. The result of this operation will have a 202 status code and will return the location of the created Service Instance in the 'Location' header. |
| /ServiceInstances ('InstanceId') | GET | One | Gets the service instance by the specific instance identifier. The status, endpoint, connection credentials, and service specific information is available by querying an instance |
| /ServiceInstances ('InstanceId') /ConnectionInformation | GET | One | Navigation Property. Gets the connection information for the specified service instance. |
| /ServiceInstances ('InstanceId') /SourceServicePackage | GET | One | Navigation Property. Gets the service package that the specified service instance was created from. |
| /ServiceInstances ('InstanceId') | DELETE | N/A | Deleting a service instance checks in the specified instance, and removes the corresponding deployment. |

TABLE 1-continued

| Relative URI | Supported HTTP Methods | Result Cardinality | Summary |
| --- | --- | --- | --- |
| /ServicePackages | GET | Many | Gets this list of available service packages that can be checked out to get a service instance. |
| /ServicePackages ('PackageId') | GET | One | Gets the service image specified by the specified image identifier. |
| /ServicePackages ('PackageId') /ServiceInstances | GET | Many | Navigation Property. Gets all of the service instances that have been checked out from this image. |
| /PackageInstances | GET | Many | Read Only. Gets the collection of package instances. |
| /PackageInstances ('PackageInstanceID') | GET | One | Gets a single package instance. |

Referring again to FIG. 1, a deployment services host (DSH) 109 provides partner VMs 104 with a bidirectional asynchronous communication capability with the DS system and the corresponding DS Provider 108.

A deployment services manager 110 brokers requests from REST API 107 into the appropriate DS provider methods. The deployment service manager 110 coordinates interactions with the deployment services provider 108, deployment services resource manager (DSRM) 111, and the deployment services communications manager (DSCM) 112.

The deployment services provider 108 contains logic that decides when to scale partner deployments, such as by adding or removing VMs 104 to support increased client demand. Deployment services provider 108 also contains logic to bring a new service instance online, such as communicating with the new deployment to create user accounts, get authentication credentials, etc.

In one embodiment, when the deployment services provider 108 is created, it gets access to deployment services resource manager 111 and the deployment services communications manager 112. The deployment services communications manager 111 is responsible for facilitating communication between deployment services provider 108 and a Package Instance running on a VM 104. Communications between the deployment services provider 108 and a Package Instance are encrypted using transport encryption. The deployment services resource manager 112 is responsible for deploying VM images registered with the deployment services into the cloud service 103.

The deployment services provider 108 uses a checkout method when a service instance is created via the deployment services REST API 107. The checkout method determines whether to use an available VM 104 for the new service instance or to use the deployment services resource manager 111 to deploy and provision the service instance specified by the new service request. Deployment services provider 108 uses a checkin method when a service instance is deleted from the deployment services REST API 107 or when the partner REST API 106 detects an idle deployment that may be reclaimed due to inactivity. Deployment services provider 108 uses the deployment services resource manager 111 to remote or undeploy a service instance.

The deployment services provider 108 may also get the status of a deployed service instance. For example, a client 102 that is consuming the service will poll the partner service REST API 106 to get a service status. The partner service REST API 106 will then call the deployment services REST API 107, which will cause the deployment services provider to get and return the service instance status. The deployment services provider 108 may also return service instance information, such as the credentials and endpoint that the service consumer will use to access the deployed service instance.

Information used by the DS system, such as IaaS OS images, VM images, VHD images, configuration options, or any other data required for a partner service, may be stored in DS resource management database 113.

If a service fails, such as a service on a package instance becoming unusable or unable to communicate, VM 104 or the service will cease sending heartbeats. The partner or a consumer of deployment services REST API 107 will detect the package instance with an old heartbeat, determine if a service is unavailable, and take appropriate action. The partner is typically in the position to determine if a service has reached an unhealthy state. The partner may, for example, observe the last received heartbeat of a package instance and take the appropriate action to migrate the service to a new VM 104 or to close service instances.

Figure 3:
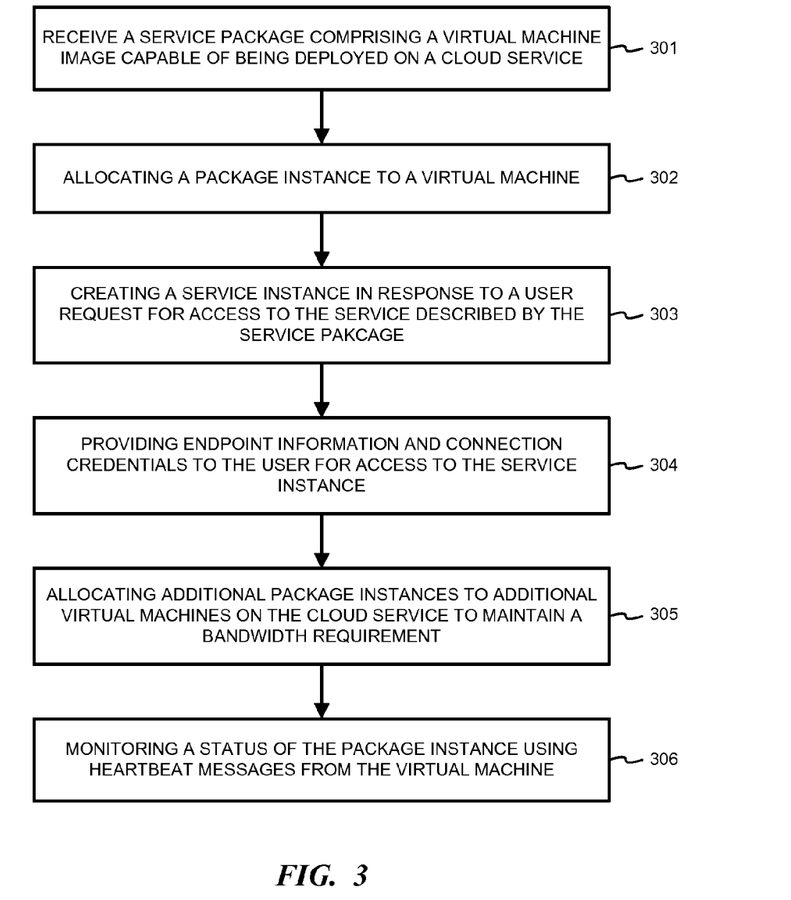
FIG. 3 is a flowchart illustrating a process or method for configuring a system to provide services defined by partners.

FIG. 3 is a flowchart illustrating a process or method for configuring a system to provide services defined by partners. In step 301, a service package is received on a cloud service. The service package is received via a REST API from a customer. The service package comprises a virtual machine image that is capable of being deployed on the cloud service. The image may be an operating system image, a virtual hard drive file, or a cloud service package, and may include configuration information.

In step 302, a package instance is allocated to a virtual machine on the cloud service. The package instance represents an instance of the service package. In step 303, a service instance is created in response to a user requesting access to a service described in the service package. The service instance is associated with the package instance allocated to the virtual machine. In step 304, endpoint information and connection credentials are provided to the user for access to the service instance.

In step 305, additional package instances are allocated to additional virtual machines on the cloud service to maintain a customer bandwidth requirement. Additional service instances may also be created in response to additional user requests for access to the service described in the service package. Each service instance is associated with the package instance that was allocated to the virtual machine.

In step 306, the health and status of the package instance is monitored using heartbeat messages from the virtual machine.

It will be understood that steps 301-306 of the process illustrated in FIG. 3 may be executed simultaneously and/or sequentially. It will be further understood that each step may be performed in any order and may be performed once or repetitiously.

In another embodiment, the techniques disclosed by the inventors can be used for an Origin Streaming service. The Origin Streaming service provides a different approach compared to the Deployment Services system because a Partner is not used to provide services to clients. Instead, the Origin Streaming service controls the allocation of servers on a cloud service to provide media streaming services. Customers sign-up for media streaming services and the hardware resources for supporting these services are then automatically managed by the Origin Streaming service based on the customer requirements and requested SLA.

Components of the Origin Streaming service comprise:
Origin Provisioning Service: a component that is responsible for management of the hardware resources based on the customer requirements.
Cloud Services API: a library API that provides a simpler abstraction on top of cloud service APIs.
Health Monitor: a component that is responsible for monitoring the health of the allocated streaming services.

The Origin Streaming services approach provides a simpler model to the customers. The customers indicate their needs in terms of media streaming requirements, such as desired bandwidth, and an origin provisioning service manages resources through the cloud services APIs. The Origin Streaming may optimize resource allocation by serving multiple customers from the same pool of virtual machines (VM) or by serving a single customer using a dedicated pool of machines. The optimization may be based, for example, on a requested SLA.

In one embodiment, referred to herein as an Origin Provisioning Service, customers can choose to serve on-demand content from a variety of origin services to clients. This may include services from the cloud service provider or third party providers. The Origin Provisioning Service enables dynamic allocation of origin deployments according to the customer specifications, such as origin service type, SLA level, etc. Unlike the Deployment Service system, the Origin Provisioning Service does not require the customer to provide a VM configuration or OS image.

The Origin Provisioning Service offers a number of different Origin service types (i.e., different providers, origins, formats, etc.). Customers select from one to all of the Origin service types to be deployed at the same time. Customers also select SLA levels based around their bandwidth requirements. For example, customers may select no bandwidth guarantees, such as on a trial or pay-as-you-go subscription, or a minimum bandwidth guarantee, which may be offered in various fixed increments. The Origin Provisioning Service increase or decrease the bandwidth SLA according to the customer's needs.

In one embodiment, each customer account has only one service offering type at time, such as pay-as-you-go or bandwidth SLA, for a given origin type; however, customers may have multiple accounts to provide different offer types and services from different origins.

The Origin Provisioning Service may offer different deployment service options depending upon customer requirements, such as support for a cloud service deployment (.cspkg) for a simpler development model or support for VM deployment for more flexibility that may be required for third party support. The Origin Provisioning Service may also support scalable deployments, which allows instances to be added or removed to support SLA bandwidth requirements. Other options include support for dynamic configuration change on a per deployment basis, support for zero-downtime automated deployment upgrade, support for subscription partitioning, and pre-allocation deployment.

The Origin Provisioning Service uses health monitoring to ensure availability of the service required by the customer. The health monitoring allows the Origin Provisioning Service to track origin deployment health and track service availability. The service automatically recovers when a VM or service instance failure is detected.

When a customer registers for the service, they are assigned a URL, endpoint, or other asset locator for their service. The asset locator remains valid for each service offering over time even when there are internal topology changes on the cloud service due to architectural changes.

Figure 4:
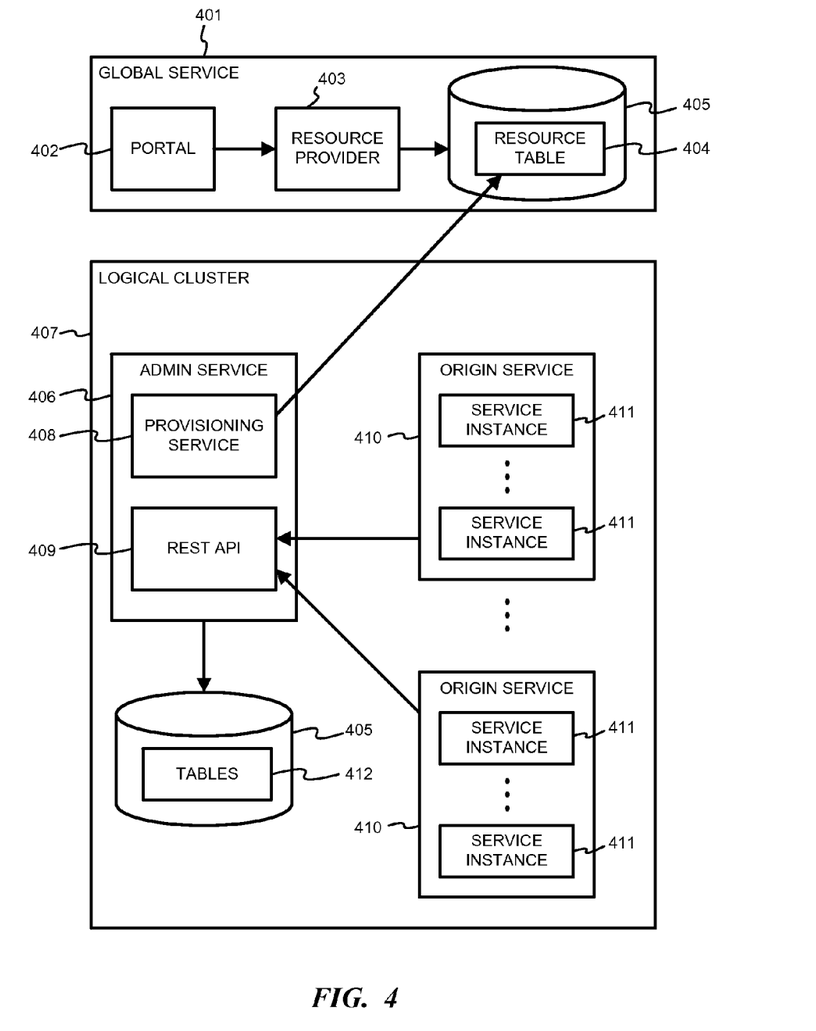
FIG. 4 is a deployment topology for the Origin Provisioning Service according to one embodiment.

FIG. 4 is a deployment topology for the Origin Provisioning Service according to one embodiment. Global service 401 comprises portal 402 and resource provider 403 components that allow the customer to interact with the system. Changes made by the customer through the portal are applied to a resource table 404 located in a global storage 405.

An admin service 406 in a logical cluster 407 is a hosted service for administrative roles for the Origin Provisioning Service. The admin service 406 hosts a provisioning service 408, which controls the provisioning of origin services, and a REST API 409, which provides the REST API layer for the Origin Provisioning Service.

The logical cluster 407 comprises many instances of origin services 410—one for each customer under SLA, and one or more for shared pools for trial and pay-as-you-go users. Origin services 410 provide media streaming, such as video on demand (VOD). Typically, there are multiple instances 411 on each hosted origin service 410 for redundancy and requested capacity.

The media streaming services are provided by instances of the Origin Services. In one embodiment, trial and pay-as-you-go customers share one or more machine pools per Origin service type. In this case, the use of machines may be maximized across all customers without guaranteeing a quality of service (QoS) for a single customer within the pool. For customers that are under SLA, each customer that requires QoS assurance is assigned to a dedicated hosted service. This ensures that each customer has a fixed minimum amount of bandwidth available that is not shared with other customers. This isolates each customer from problems that might be impacting other customers, such as denial of service scenarios that might be malicious or not. Different origin types have different hosted services to prevent endpoint collisions.

The Origin Service is managed as a pool once customers are registered with the service. For each deployment there is an initial provisioning. Once a customer signs-up for a dedicated pool offer, a new pool dedicated pool is instantiated. This requires creation of the hosted service, creation of the deployment (e.g., instances and VMs), monitoring of the deployment progress, status updates to the portal, and a final update once deployment is ready. It may be possible to pre-allocate deployments of various sizes so that a pre-allocated deployment can be assigned to a customer as soon as they sign up.

Once the deployed, the service is monitored. Service monitoring ensures that the service is available by pinging the public service endpoint. This service monitoring may be performed on a frequent basis to quickly detect service interruptions. The ping may be performed using a special case locator that does not count towards metrics and billing, for example. VM and instance monitoring of individual VMs is accomplished by periodic pings to the REST layer to get health reports. This is useful for guaranteed SLAs, where the provisioning service may compare the pings with an expected deployment/VM state and may raise alerts when VMs are not in the expected state.

In one embodiment, existing deployments of the Origin Provisioning Service are upgraded with zero downtime and minimal customer impact. Deployment upgrades may be automatically triggered by the upload of a new service VM image or package. In a cloud services deployment, upgrades may be rolled out by upgrade domains. In a virtual machine deployment, the VM role is no upgraded. Instead, a new role instance is added using a new VM image and the VMs using old images are deleted. Upgrades may be rolled out slowly across different customers to prevent multiple concurrent upgrades from causing longer upgrade times and possible failures.

A customer deployment is deleted once the customer is not paying for a dedicated pool anymore. In one embodiment, a hosted service is maintained for a limited amount of time, such as a week or a month) in case the customer reactivates the service.

An Origin Service Global Resource Allocation Table is used for communication between the Resource Provider 403 and the Origin Provisioning Service 408 and may serve as a reference to the resource provider 403 to show the current active services. The Origin Service Global Resource Allocation Table has a single entry for each active origin service. Table 2 is a listing of fields in an Origin Service Global Resource Allocation Table according to one embodiment. It will be understood that other embodiments may use other combinations of parameters.

TABLE 2

Origin Service Global Resource Allocation Table

Account Identifier
Origin Service Type
State
Desired Bandwidth
Pool Management Certificate
Error List An Origin Service Resource Allocation Table is used by the Origin Provisioning Service 408 to track the current state of operations started by the Resource Provider 403. Table 3 is a listing of fields in an Origin Service Resource Allocation Table according to one embodiment. It will be understood that other embodiments may use other combinations of parameters.

TABLE 3

Origin Service Resource Allocation Table

Account Identifier
Origin Service Type
State
Origin Service Resource Allocation Table
Desired Bandwidth
Optional Subscription Id for dedicated deployments.
Pool Management Certificate
Error List Additional tables 412 stored in global storage 405 may be used by the Origin Provisioning Service to manage the deployments. A Shared Pools Table contains information about the available shared pool and is used to track the active shared pools within a logical deployment. An Account Pool Mappings Table contains a mapping that provides an identification of the origin pool for each customer. Once a resource allocation entry changes, this table needs to be consulted in order to determine the current account state. A Pools Table tracks all the deployments being managed by provisioning service 408 in both shared and dedicated pools.

Service availability may be determined by a health monitor component of the provisioning service. Each individual deployment may be monitored through heartbeats and test content. Heartbeats are sent by individual machines through the REST API. The heartbeat may represent the health of various streaming components. If a component is unavailable, then the heartbeat is not sent and the lack of a current heartbeat indicates a failure to components. Test content is available to all pools that can be reached by the provisioning service. These components may be combined to determine an overall service availability in a per deployment basis.

Customers of the Origin Provisioning Service may be supported using a single shared pool or using dedicated customer pools.

In the shared pool approach, all customers share the same pool within a datacenter. This single pool hosts all Origin Services of a given type independent of the customer SLA. This provides a simpler management because there is no need to dynamically provision hosted services or to manage individual pools of machines per customer. The single shared pool may also provide higher availability and reduced cost as the shared capacity accommodates individual customer peaks with less total capacity across all customers. A single pool with extra capacity may provide instant provisioning to new and expanding customers allowing changes in a desired capacity with zero wait time.

In a dedicated pool approach, each customer is assigned to its own pool of machines. These pools size can be dynamically increased or decreased accordingly with the user SLA level. A dedicated pool does not require throttling due to other customer demands because the hosted service is not shared with other customers. The cloud service networking infrastructure provides tenant isolation. The dedicated pools also provide a uniform model for all origin implementations whether they are offered by the cloud service or third parties. Additionally, IP filtering may be implemented on a per customer basis for the shared pools.

Figure 5:
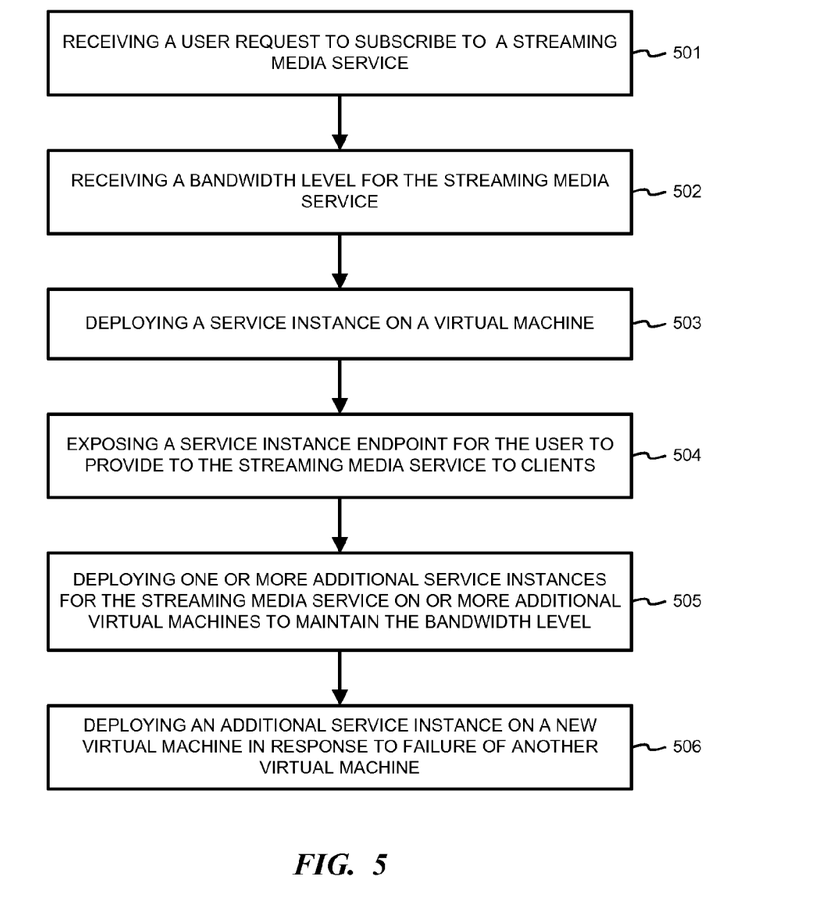
FIG. 5 is a flowchart illustrating a method or process for providing streaming media services according to another embodiment.

FIG. 5 is a flowchart illustrating a method or process for providing streaming media services according to another embodiment. In step 501, a user request to subscribe to a streaming media service is received. In step 502, a bandwidth level for the streaming media service is received from the user. In step 503, a service instance is deployed to two or more virtual machines for redundancy and to meet requested capacity. The service instance is configured to provide the streaming media service at the bandwidth level. In step 504, a service instance service endpoint is exposed for the user. The user can provide access to the streaming media to clients via the endpoint.

Customers can increase or decrease their existing service capacity to serve more or less users. This is then translated to the service instance being deployed to additional virtual machines or removed from virtual machines when there are less users.

In step 505, in response to client demand levels, one or more additional service instances for the streaming media service are deployed on one or more additional virtual machines to maintain the bandwidth level requested by the user.

The health status of the virtual machines is monitored, such as by heartbeats. In step 506, when a virtual machine has been detected as failed, an additional service instance is deployed on a new virtual machine. The additional service instance supports the same streaming media service at the bandwidth level provided by the failed virtual machine.

The virtual machines may be updated without interrupting service availability for the streaming media. This may occur, for example, by providing a new service instance on an already updated virtual machine to take over for a machine that will be updated.

In other embodiments, a service instance that supports the streaming media service may be pre-allocated on a virtual machine prior to receiving user requests for streaming media services. When a user request for the streaming media service is received, the requested stream, the user may be configured to use the pre-allocated virtual machine at a bandwidth level in the user request.

It will be understood that steps 501-506 of the process illustrated in FIG. 5 may be executed simultaneously and/or sequentially. It will be further understood that each step may be performed in any order and may be performed once or repetitiously.

Figure 6:
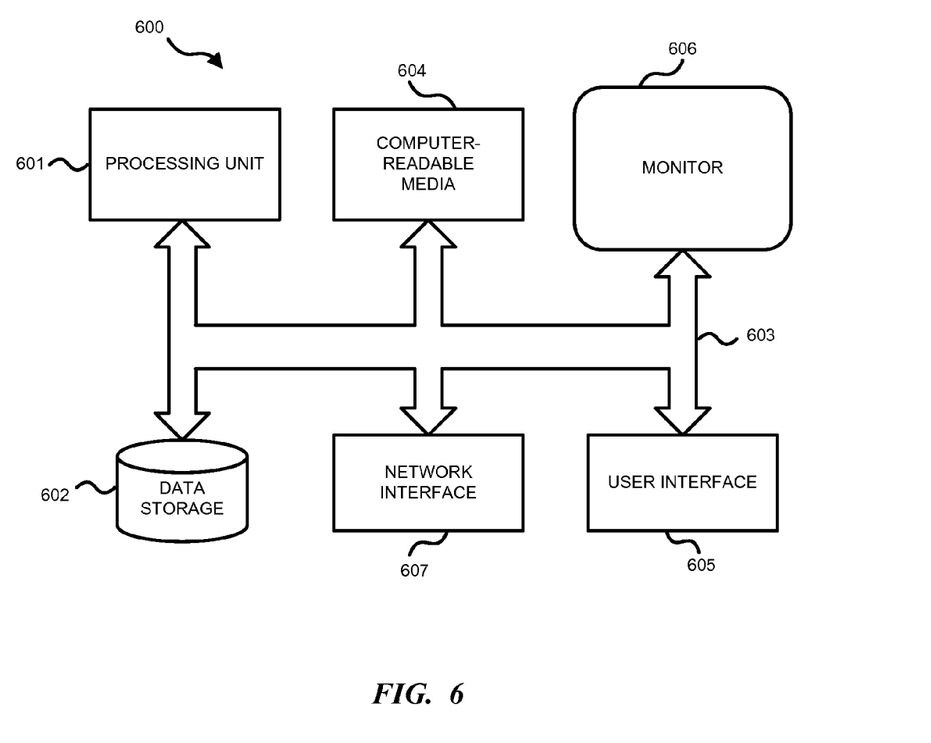
FIG. 6 illustrates an example of a suitable computing and networking environment for implementing a deployment service or origin provisioning service.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments, such as a cloud computing service, where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 600. Components may include, but are not limited to, various hardware components, such as processing unit 601, data storage 602, such as a system memory, and system bus 603 that couples various system components including the data storage 602 to the processing unit 601. The system bus 603 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 600 typically includes a variety of computer-readable media 604. Computer-readable media 604 may be any available media that can be accessed by the computer 600 and includes both volatile and nonvolatile media, and removable and non-removable media, but excludes propagated signals. By way of example, and not limitation, computer-readable media 604 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 602 includes computer storage media in the form of volatile and/or nonvolatile memory such as read only memory (ROM) and random access memory (RAM). A basic input/output system (BIOS), containing the basic routines that help to transfer information between elements within computer 600, such as during start-up, is typically stored in ROM. RAM typically contains data and/or program modules that are immediately accessible to and/or presently being operated on by processing unit 601. By way of example, and not limitation, data storage 602 holds an operating system, application programs, and other program modules and program data.

Data storage 602 may also include other removable/non-removable, volatile/nonvolatile computer storage media. By way of example only, data storage 602 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 600.

A user may enter commands and information through a user interface 605 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 601 through a user input interface 605 that is coupled to the system bus 603, but may be connected by other interface and bus structures, such as a parallel port, game port or a universal serial bus (USB). A monitor 606 or other type of display device is also connected to the system bus 603 via an interface, such as a video interface. The monitor 606 may also be integrated with a touch-screen panel or the like. Note that the monitor and/or touch screen panel can be physically coupled to a housing in which the computing device 600 is incorporated, such as in a tablet-type personal computer. In addition, computers such as the computing device 600 may also include other peripheral output devices such as speakers and printer, which may be connected through an output peripheral interface or the like.

The computer 600 may operate in a networked or cloud-computing environment using logical connections 607 to one or more remote devices, such as a remote computer. The remote computer may be a personal computer, a server, a router, a network PC, a peer device or other common network node, and typically includes many or all of the elements described above relative to the computer 600. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 600 may be connected to a public or private network through a network interface or adapter 607. In some embodiments, a modem or other means for establishing communications over the network. The modem, which may be internal or external, may be connected to the system bus 603 via the network interface 607 or other appropriate mechanism. A wireless networking component such as comprising an interface and antenna may be coupled through a suitable device such as an access point or peer computer to a network. In a networked environment, program modules depicted relative to the computer 600, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a computer system having a processor and a memory, the memory having program instructions stored thereon that, upon execution by the processor, cause the computer system to deploy a distributed computing service, a method comprising:

receiving a service package for a service to be provided to one or more clients via one or more virtual machines, the service package comprising an Operating System (OS) image and a set of configuration options, wherein the configuration options include: a plurality of service certificates usable for authentication, a network configuration information, a set of available regions, a virtual machine size, and a package name, wherein the service certificates include a list of certificates and corresponding certificate passwords to be installed on one or more virtual machines, wherein the network configuration information includes a list of network ports to be exposed upon deployment of a given virtual machine, and wherein the set of available regions lists cloud service regions and an image name for each region where the service is deployed;

allocating two or more package instances to the service package on the distributed computing service, the package instances representing different instantiations of the service package; and creating one or more service instances for each package instance in response to the one or more clients requesting access to the service, wherein each service instance is associated with a corresponding one of the package instances allocated to the virtual machine.

2. The method of claim 1, further comprising:
providing endpoint information and connection credentials to the one or more clients for access to a given one of the service instances.

3. The method of claim 1, wherein the receiving, allocating, and creating are each performed in response to instructions.

4. The method of claim 1, further comprising:
allocating additional package instances to create additional virtual machines on the distributed computing service to maintain a client bandwidth requirement.

5. The method of claim 4, further comprising:
creating additional service instances in response to additional client requests for access to the service.

6. The method of claim 1, further comprising:
monitoring a status of each package instance using heartbeat messages.

7. A computer system comprising:
one or more processors; and
a memory coupled to the one or more processors, the memory having instructions stored thereon that, upon execution by the one or more processors, cause the computer system to:
receive a service package for a service to be provided to one or more clients via one or more virtual machines, the service package comprising an Operating System (OS) image and a set of configuration options, wherein the configuration options include: a plurality of service certificates usable for authentication, a network configuration information, a set of available regions, a virtual machine size, and a package name, wherein the service certificates include a list of certificates and corresponding certificate passwords to be installed on one or more virtual machines, wherein the network configuration information includes a list of network ports to be exposed upon deployment of a given virtual machine, and wherein the set of available regions lists cloud service regions for each region where the service is deployed;
allocate two or more package instances to the service package, the package instances representing different instantiations of the service package; and
create one or more service instances for each package instance in response to the one or more clients requesting access to the service, wherein each service instance is associated with a corresponding one of the package instances allocated to the virtual machine.

8. The computer system of claim 7, wherein the instructions, upon execution by the one or more processors, further cause the computer system to:
provide bidirectional communication, via a host on each virtual machine, between the virtual machine and a provider.

9. The computer system of claim 7, wherein the instructions, upon execution by the processor, further cause the computer system to receive the service package from a provider.

10. The computer system of claim 7, wherein the instructions, upon execution by the processor, further cause the computer system to create two or more service instances based upon each of the two or more package instances in response to a client requesting access to the service.

11. The computer system of claim 7, wherein the instructions, upon execution by the processor, further cause the computer system to receive heartbeat messages from a given package instance to monitor a status of the given package instance.

12. The computer system of claim 7, wherein the instructions, upon execution by the processor, further cause the computer system to provide endpoint information and connection credentials to clients for access to the service instances.

13. A memory having computer-executable instructions stored thereon that, upon execution by at least one processor of a computer system, cause the computer system to:
deploy a service instance on a virtual machine in response to a client requesting to subscribe to a streaming media service, the service instance configured by a service provider to provide the streaming media service at a requested bandwidth level using a service package comprising an Operating System (OS) image and a set of configuration options, wherein the configuration options include: a plurality of service certificates usable for authentication, a network configuration information, a set of available regions, a virtual machine size, and a package name, wherein the service certificates include a list of certificates and corresponding certificate passwords to be installed on one or more virtual machines, wherein the network configuration information includes a list of network ports to be exposed upon deployment of a given virtual machine, and wherein the set of available regions lists cloud service regions and image names for each region where the service is deployed;
allocate two or more package instances to the service package, the package instances representing different instantiations of the service package, wherein each service instance is associated with a corresponding one of the package instances allocated to the virtual machine; and
expose a service instance service endpoint for the client to provide access to the streaming media service.

14. The memory device of claim 13, wherein the computer-executable instructions, upon execution by the at least one processor, further cause the computer system to:
receive requests to subscribe to a streaming media service from additional clients;
deploy additional service instances, each of the additional service instances configured to provide a streaming media service requested by an additional client.

15. The memory device of claim 13, wherein the computer-executable instructions, upon execution by the at least one processor, further cause the computer system to:
in response to demand levels, deploy one or more additional service instances for the streaming media service on one or more additional virtual machines to maintain the bandwidth level requested by the client.

16. The memory device of claim 13, wherein the computer-executable instructions, upon execution by the at least one processor, further cause the computer system to:
monitor a health status of the virtual machines; and
deploy an additional service instance on a new virtual machine in response to failure of another virtual machine, the additional service instance supporting the same streaming media service at the bandwidth level provided by the failed virtual machine.

17. The memory device of claim 13, wherein the computer-executable instructions, upon execution by the at least one processor, further cause the computer system to:

update the virtual machine without interrupting service availability for the streaming media.

18. The memory device of claim 13, wherein the computer-executable instructions, upon execution by the at least one processor, further cause the computer system to:
pre-allocate a service instance supporting the streaming media service on a pre-allocated virtual machine prior to receiving the client request for the streaming media service; and
configure the pre-allocated virtual machine to provide the streaming media service at the bandwidth level in response to the client request.

* * * * *